Figure 1:
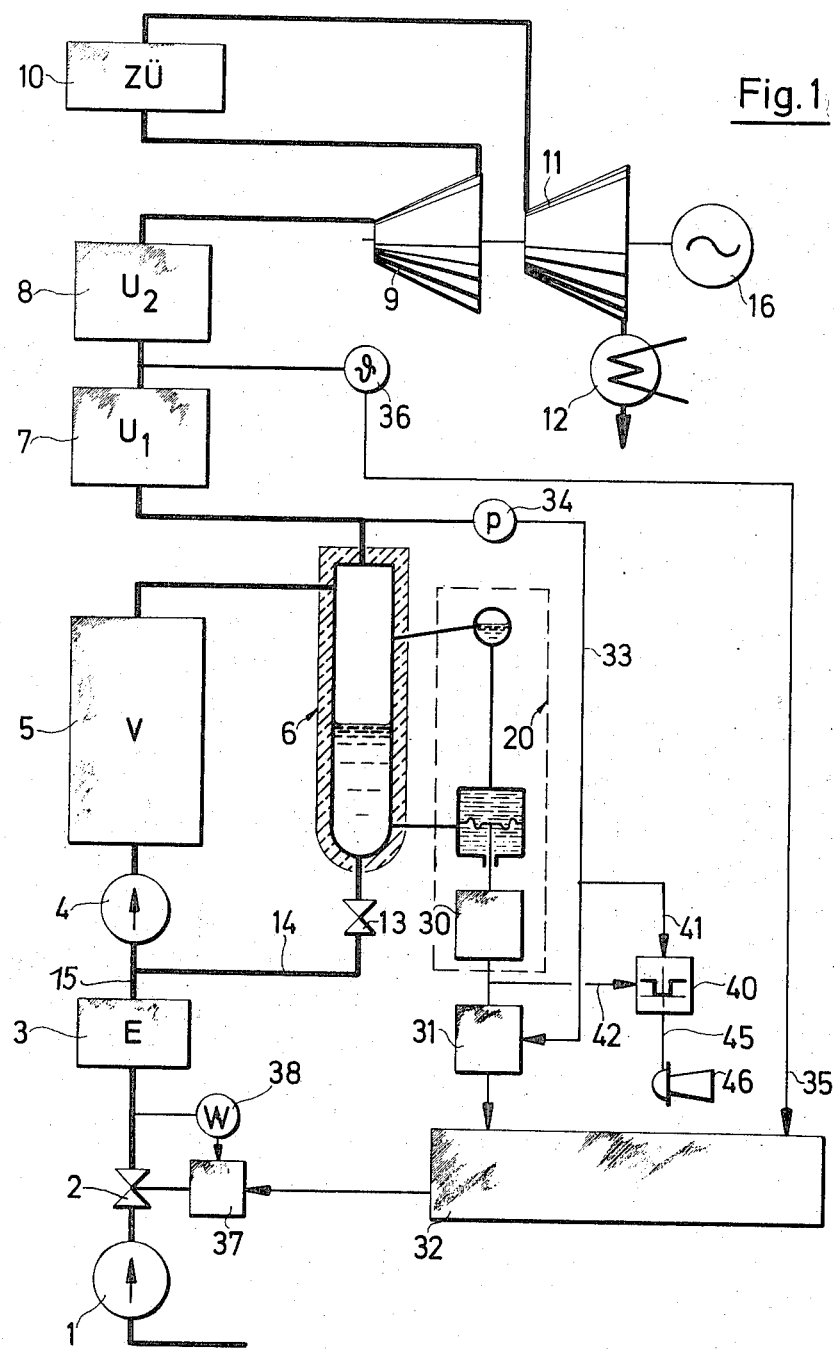

United States Patent [19]
Frei

[11] 3,828,738
[45] Aug. 13, 1974

[54] FEED WATER CONTROL IN FORCED CIRCULATION STEAM GENERATORS

[75] Inventor: Paul Frei, Lindau/Schweiz, Switzerland

[73] Assignee: Sulzer Brothers Ltd., Winterthur, Switzerland

[22] Filed: May 9, 1973

[21] Appl. No.: 358,828

[30] Foreign Application Priority Data
May 16, 1972 Switzerland.......................... 215/72

[52] U.S. Cl............................ 122/504.2, 122/451 S
[51] Int. Cl.............................................. F22d 5/00
[58] Field of Search ........... 122/448 S, 451 S, 504.2

[56] References Cited
UNITED STATES PATENTS

| | | | |
|---|---|---|---|
| 1,833,630 | 11/1931 | Yarnall | 122/504.2 |
| 2,170,346 | 8/1939 | Dickey | 122/448 |
| 3,168,075 | 2/1965 | Profos | 122/451 |

Primary Examiner—Kenneth W. Sprague
Attorney, Agent, or Firm—Kenyon & Kenyon Reilly Carr & Chapin

[57] ABSTRACT

The forced circulation steam generator is provided with a means for measuring the difference in pressure between two levels in the water separator in order to measure the water level in the separator. The water feed rate to the evaporator is controlled in dependence on the measured pressure difference in the separator when the separator contains water and in dependence on another variable, such as the temperature at the outlet of a superheater, when the separator is dry.

3 Claims, 4 Drawing Figures

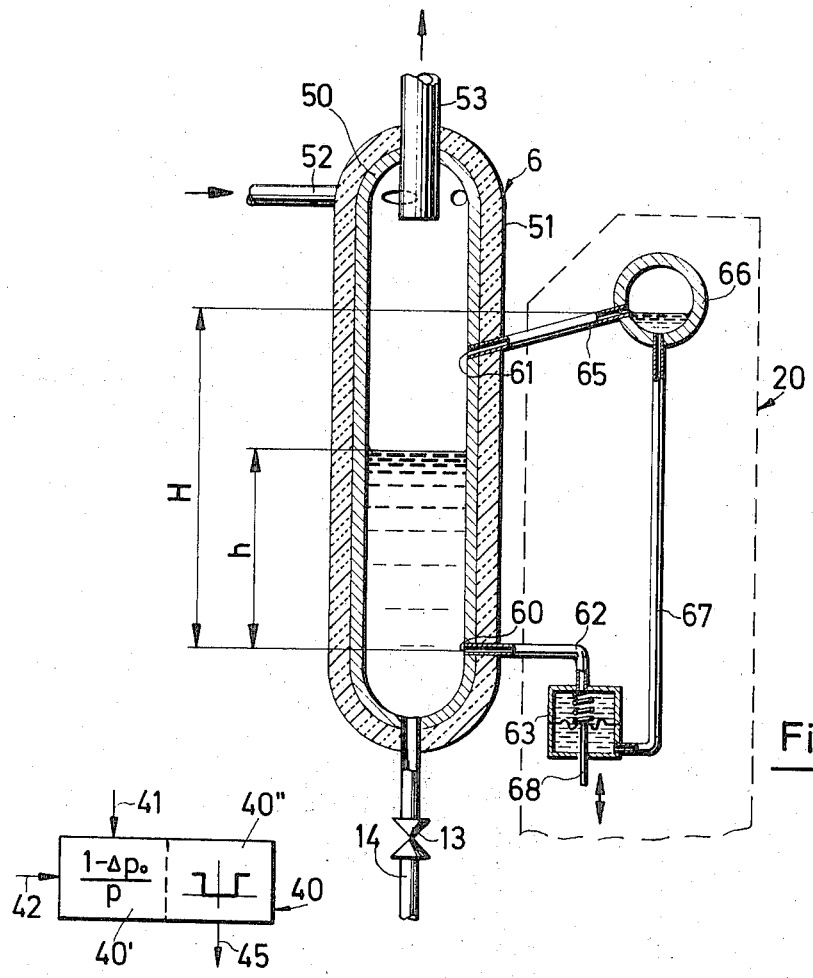
Fig. 2
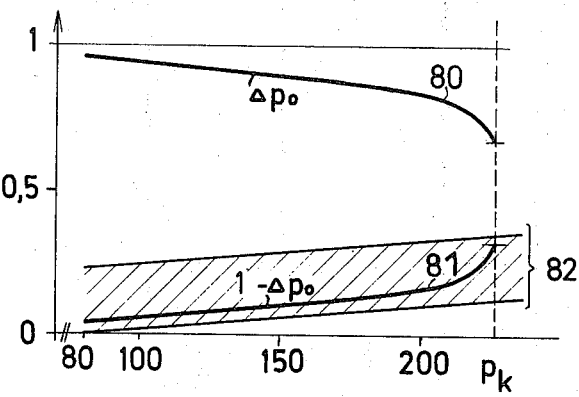
Fig. 4
Fig. 3

FEED WATER CONTROL IN FORCED CIRCULATION STEAM GENERATORS

This invention relates to forced circulation steam generators constructed to operate with sliding, i.e., variable, pressure.

According to the present invention, a forced circulation steam generator constructed to operate with sliding pressure has an evaporator, a superheater, a water separator between the evaporator and the superheater, means for measuring the difference in pressure between two levels in the water separator to measure the water level in the separator, means controlling the rate of feed of water to the evaporator in dependence on the measured pressure difference when the separator contains water and in dependence on another variable when, in an upper load range, the separator is dry, and means for generating an alarm signal if the measured pressure difference lies outside a predetermined range.

Such a steam generator is operated with a wet separator in the lower load range and with a dry separator in the upper load range. Without the alarm means, this could give rise to difficulties if the relatively sensitive pressure difference measuring means were to become faulty during operation in the upper load range, since the fault might then remain undetected for a prolonged period so that serious difficulties might suddenly arise during change-over to operation with a wet separator. However, the alarm means constantly monitors the apparatus for measuring the pressure difference during the period of time in which the separator is operated under dry conditions. The alarm means utilises the principle that because of the column of cooled condensate present in the apparatus for measuring the pressure difference the latter always delivers a signal which varies within narrow limits even when the separator is dry.

The steam generator can be operated at all times with sliding pressure, even if it has previously operated for many weeks in the upper load range and it is possible thereafter without risk to operate the steam generator in the lower load range in which the separator is once again operated under wet conditions. According to one form of steam generator, the measured pressure difference is compared with two limiting signals and the alarm signal generating means is connected to a pressure sensor which measures the pressure of the working fluid at a point in the steam generator and is so arranged that the limiting signals are varied in dependence on the measured pressure.

In this way it is possible to improve the sensitivity of the device by adapting the range limits to the pressure sensitivity of the pressure difference signal. The same effect is achieved in another form of steam generator in which the alarm signal generating means: is connected to a pressure sensor which measures the pressure of the working fluid at a point in the steam generator; is arranged to divide the measured pressure difference by the measured pressure; and is arranged to compare the quotient of the division with the predetermined range.

The invention may be carried into practice in various ways but one steam generator embodying the invention and a modification thereof will now be described by way of example with reference to the accompanying drawings, in which:-

FIG. 1 is a diagrammatic view of a steam power plant;

FIG. 2 also shows in diagrammatic form a longitudinal section through the water separator and apparatus for measuring the pressure difference of the plant shown in FIG. 1;

FIG. 3 is a diagram showing the change of pressure difference with a dry separator plotted against the boiler pressure, the characteristics of one function of the aforementioned pressure difference and the characteristic of the range signal; and FIG. 4 is a diagrammatic representation of a modified form of limiting element.

FIG. 1 shows a forced-circulation steam generator which essentially comprises an economiser 3, an evaporator 5, a water separator 6 and two superheaters 7 and 8 as well as a reheater 10 all of which are serially connected in terms of the flow of working fluid. The steam generator is supplied by a feed pump 1 which draws feed water from a feed water tank, not shown, and delivers it via a feed valve 2 to the economiser 3. The lower end of the water separator 6 is connected via a line 14 to a line 15 which connects the economiser 3 to the evaporator 5 and contains a circulating pump 4 situated downstream of the end of the line 14. The line 14 is provided with a valve 13 which is adjusted by the water level in the separator 6 in a manner which is not shown. Between the superheater 8 and the reheater 10 there is a high-pressure turbine 9 which drives an electricity generator 16 in conjunction with a low-pressure turbine 11 downstream of the reheater 10. The exit of the low-pressure turbine 11 is connected to a condenser 12 which is connected to the feed water tank.

In order to determine the water level in the separator 6, apparatus 20 is provided for measuring a pressure difference, the construction of the apparatus being shown in detail in FIG. 2. The output signal from the apparatus 20 is delivered to a calculator 31 which in turn is connected to an automatic controller 32 which is also supplied via a signal conductor 35 with a temperature signal obtained from a temperature sensor 36 at a position between the superheaters 7 and 8. In addition to being supplied with the output signal of the apparatus 20 for measuring the pressure difference, the calculator 31 is also supplied via a signal conductor 33 with a pressure signal which is obtained from the exit of the separator 6 by means of a pressure sensor 34. The output of the controller 32 is connected to the set value input of a feed controller 37, disposed in a feed control circuit which contains a feed water flow rate measuring element 38 and the feed valve 2.

In addition to being connected to the calculator 31, the output of the apparatus 20 for measuring the pressure difference is also connected via a signal conductor 42 to a limiting element 40 to which the pressure signal of the pressure sensor 34 is also supplied via a signal conductor 41. The output of the limiting element 40 is connected via a signal conductor 45 to an alarm apparatus 46. The signal which is supplied via the signal conductor 42 is compared in the limiting element 40 with a lower and an upper limiting value and an alarm signal is triggered if the aforementioned signal is outside the range defined by the two limiting values.

As FIG. 2 shows, the water separator 6 comprises a drum 50 which has a vertical longitudinal axis and is surrounded by thermal insulation 51. A plurality of ducts 52 are connected to the upper end of the drum 50, only one of these ducts being shown; these ducts supply the separator tangentially with the steam-water mixture which emerges from the evaporator 5. The separated water collects in the lower part of the drum 50 and is supplied via the duct 14 to the circulating pump 4. The steam which has been freed of water escapes at the upper end of the drum through the duct 53 which is connected to the inlet of the superheater 7. Connecting ducts 62 and 65 join points 60 and 61 respectively in the drum to the apparatus 20 for measuring the pressure difference to sense the water level. The connecting duct 62 leads to a diaphragm cell 63 and the connecting duct 65 rises into a hollow sphere 66. The lowest point in the hollow sphere 66 is connected by a duct 67 to a point in the diaphragm cell 63 which is on the other side of the diaphragm from the point at which the duct 62 is connected. The apparatus 20 for measuring the pressure difference is not insulated against heat dissipation so that the condensate disposed in the apparatus is cooled and does not evaporate. A condensate level defined by the upper end of the connecting duct 65 is therefore established in the hollow sphere 66. When the separator 6 is empty, the upper side of the diaphragm of the cell 63 is subjected to a water column whose head extends to the point 60 while the water column in the duct 67 acts on the underside of the diaphragm, the head of this water column extending as far as the condensate level in the hollow sphere 66. The diaphragm of the cell 63 is therefore subjected to a differential pressure which is defined by the difference of level H between the condensate level in the hollow sphere 66 and the point 60 multiplied by the difference between the density of the condensate in the pipe 67 and the density of the steam in the empty separator. The position of the rod 68 associated with the diaphragm and resulting from this pressure difference is supplied as an input signal to a signal transducer 30 which is adapted to form either the function $\Delta p_o$ or $1-\Delta p_o$ which is then supplied to the calculator 31.

The upper part of the diagram of FIG. 3 shows the characteristic of the differential pressure $\Delta p_o$ (curve 80) which acts on the diaphragm of the cell 63 plotted against the pressure $p_k$ in the steam generator. The lower part of the diagram shows the function $1-\Delta p_o$ (curve 81) of the pressure difference. The numeral 82 refers to the range which is defined by the limiting element 40 and from which no departure is permitted for the signal which is supplied by the signal transducer 30 via the signal conductor 42. The pressure signal supplied via the signal conductor 41 is arranged to increase linearly the limits of the range 82 with an increasing pressure.

During operation of the steam generator, the feed water supply is regulated in such a way that in the lower load range in which the steam generator operates at a lower pressure than in the higher load range and the separator 6 is filled with water to the upper limit of the head difference $h$ (FIG. 2), the signal from the apparatus 20 for measuring the pressure difference and representing the water level in the separator is supplied as a set value via the calculator 31 and the controller 32 to the feed controller 37. In this method of operation with a wet separator, the output signal of the limiting element 40 is suppressed in a manner not shown. The previously effective influence of the apparatus 20 for measuring the pressure difference is suppressed in the upper load range in which the separator 6 is operated dry and feed regulation is obtained from the signal transmitted by the temperature sensor 36 and supplied via the signal conductor 35 to the controller 32 which system then allows the temperature signal to predominate and supplies it in the form of a set value signal to the feed controller 37. The controller 32 may be constructed in accordance with the U.S. Pat. application Ser. No. 291934.

The limiting element 40 shown diagrammatically in FIG. 4 is subdivided into two parts 40' and 40''. The first part 40' is constructed as a division element and is connected to the signal conductors 41 and 42 to form the quotient of the variables supplied by these conductors, namely $1-\Delta p_o/p$. The quotient thus formed is then compared in the second part 40'' with the two range limits. Depending on the result of this comparison, a signal will then be transmitted where appropriate via the signal conductor 45 to the alarm. The advantage of this arrangement is that the range limits can remain constant and need not be displaced in dependence on the pressure in the steam generator.

In the arrangements described above, the range defined by the limiting element 40 covers the curve 81. It is possible alternatively to arrange the circuit in such a way that the limiting element 40 provides a range which covers the upper curve 80 of FIG. 3.

As may be seen by reference to FIG. 1, the connections of the diaphragm cell 63 shown in FIG. 2 may be interchanged.

What I claim is:

1. A forced circulation steam generator constructed to operate with sliding pressure and having an evaporator, a superheater, a water separator between the evaporator and the superheater, means for measuring the difference in pressure between two levels in the water separator to measure the water level in the separator, means controlling the rate of feed of water to the evaporator in dependence on the measured pressure difference when the separator contains water and in dependence on the steam temperature at an outlet of the superheater when, in an upper load range, the separator is dry, and means for generating an alarm signal if the measured pressure difference lies outside a predetermined range.

2. A steam generator as claimed in claim 1 in which the measured pressure difference is compared with two limiting signals and the alarm signal generating means is connected to a pressure sensor which measures the pressure of the working fluid at a point in the steam generator and is so arranged that the limiting signals are varied in dependence on the measured pressure.

3. A steam generator as claimed in claim 1 in which the alarm signal generating means: is connected to a pressure sensor which measures the pressure of the working fluid at a point in the steam generator; is arranged to divide the measured pressure difference by the measured pressure; and is arranged to compare the quotient of the division with the predetermined range.

* * * * *

UNITED STATES PATENT OFFICE
CERTIFICATE OF CORRECTION

Patent No. 3,828,738           Dated   August 13, 1974

Inventor(s)         PAUL FREI

It is certified that error appears in the above-identified patent and that said Letters Patent are hereby corrected as shown below:

In the title page correct the priority data to read as follows:

--May 16, 1972   Switzerland    7 215/72--

Signed and sealed this 29th day of October 1974.

(SEAL)
Attest:

McCOY M. GIBSON JR.                C. MARSHALL DANN
Attesting Officer                  Commissioner of Patents